United States Patent [19]

Haass

[11] 3,930,203

[45] Dec. 30, 1975

[54] CIRCUIT ARRANGEMENT FOR ADJUSTING THE PHASE STATE OF A TIMING SIGNAL

[75] Inventor: Adolf Haass, Munich, Germany

[73] Assignee: Siemens Aktiengesellschaft, Berlin & Munich, Germany

[22] Filed: Oct. 29, 1974

[21] Appl. No.: 518,813

[30] Foreign Application Priority Data

Oct. 29, 1973 Germany ............................ 2354072

[52] U.S. Cl. .................................. 328/155; 307/262

[51] Int. Cl.$^2$ ............................................ H04B 1/02

[58] Field of Search ....................... 328/155; 307/262

[56] References Cited

UNITED STATES PATENTS 3,585,298 6/1971 Libermann .......................... 328/155

3,739,103 6/1973 Hess .................................. 307/262

3,851,101 11/1974 En et al. ............................ 328/155

FOREIGN PATENTS OR APPLICATIONS 746,744 3/1956 United Kingdom ................ 328/155

*Primary Examiner*—John Kominski

[57] ABSTRACT

Apparatus for adjusting the phase state of a timing signal used, for example, to synchronize a data receiver in a data transmission system is described. The timing signal is obtained from a divider signal. A discriminator signal from the phase state of a binary signal and pulse edges are added to or suppressed from the divider signal. A switching stage is caused to assume one of two states in dependence on the value of the discriminator signal. Parts of the divider signal are conducted over a first channel and a phase reversing stage or a second channel to the input of the frequency divider, from the output of which the timing signal is emitted.

6 Claims, 8 Drawing Figures

CIRCUIT ARRANGEMENT FOR ADJUSTING THE PHASE STATE OF A TIMING SIGNAL

BACKGROUND OF THE INVENTION

The invention relates to a circuit arrangement for adjusting the phase state of a timing signal. The apparatus in question is of the type wherein a timing signal is obtained with a frequency divider from a divider signal, and wherein, in dependence upon the phase state of a binary signal, a discriminator signal is obtained and pulse edges of the divider signal are suppressed or pulse edges are added to the divider signal. The binary signal can be used, for example, to transmit data within the frame of a bit pattern wherein a data terminal device is synchronized at the receiving end with the aid of the timing signal.

As is known, for the production of a timing signal an oscillator is often used to produce an oscillator signal from which, by frequency division, a divider signal is obtained from which the timing signal is then obtained. If the phase state of the timing signal is to be changed, this can be effected in known manner by interposing pulses between the pulses of the divider signal. If a divider signal of a high pulse repetition frequency must be used, it is difficult to interpose further pulses between the individual pulses of the divider signal.

An object of this invention is to provide a circuit arrangement by means of which pulses can be additionally interposed into the divider signal, even when the pulse repetition frequency of this divider signal is relatively high.

Another object of the invention is to provide a circuit arrangement which, even in the case of a divider signal having a high pulse repetition frequency, enables an additional insertion of pulse edges in the event of a lagging timing signal and a reduction in the pulse edges of the divider signal in the event of a leading timing signal.

SUMMARY OF THE INVENTION

In accordance with the invention a switching stage is provided which in dependence upon the discriminator signal assumes a first and second switching position in which parts of the divider signal are conducted via a first channel and polarity reversal stage, and via a second channel, respectively, to the input of a further frequency divider from the output of which the timing signal is emitted.

The invention is characterized in that it enables additional pulse edges to be inserted between two pulses of a divider signal, even when the divider signal has a relatively high pulse repetition frequency. This advantage of the circuit of the invention is possible because one does not interpose two further pulse edges of an additional pulse between two existing pulse edges of the divider signal as with known circuit arrangements, but in each case one single pulse edge is inserted between the two pulse edges of the divider signal, at two points.

If the phase state of the timing signal is to be displaced, not only in the leading direction, but also in the lagging direction, it is desireable to switch over the switching stage between two pulse edges of the divider signal when the binary signal leads the timing signal, whereas the switching stage is to be switched over simultaneously to one pulse edge of the divider signal when the binary signal lags the timing signal.

In a preferred exemplary embodiment of the invention, the polarity reversal stage is in the form of an EXCLUSIVE-OR gate whose input is supplied with the divider signal and the discriminator signal, and whose output is connected to the further frequency divider.

BRIEF DESCRIPTION OF THE DRAWINGS

The principles of the invention will be better understood by reference to the description given below of preferred embodiments of the invention along with the drawings which are briefly described immediately below and in which like elements are referred to by like reference letters or numerals.

DETAILED DESCRIPTION OF THE DRAWINGS

Figures 1, 2:
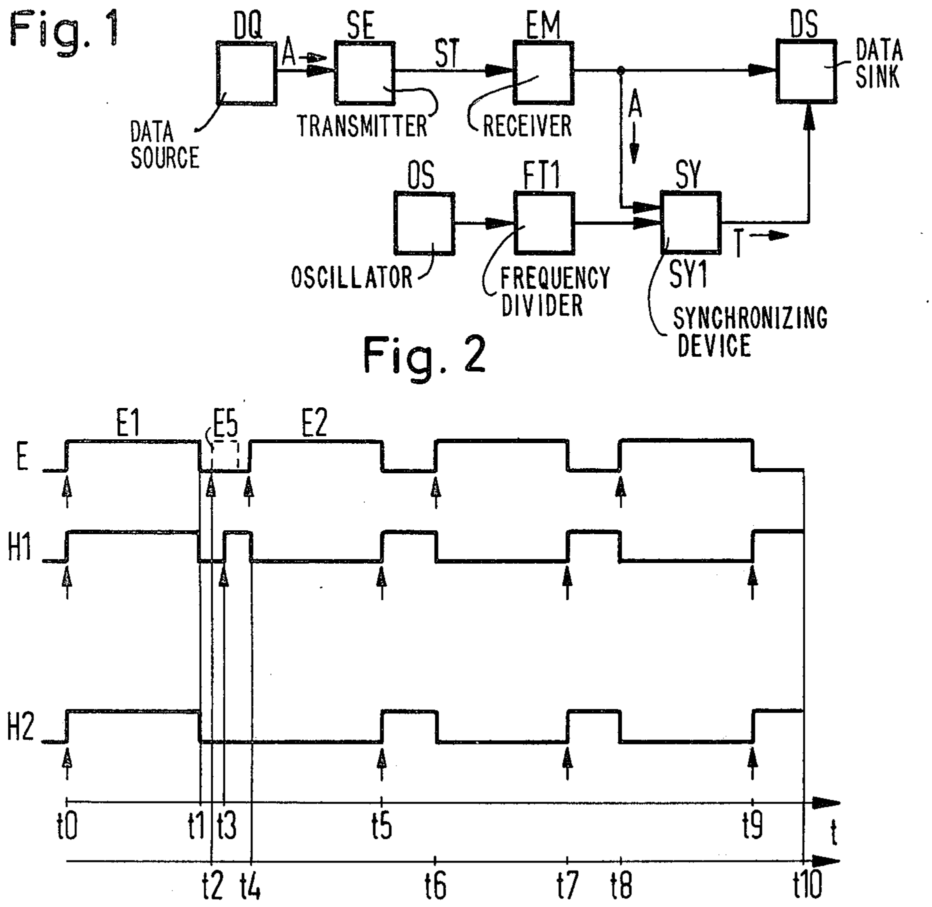
FIG. 1 shows an example of a data transmission system in which the invention is used in a schematic illustration.
FIG. 2 is a time-waveform diagram illustrating divider signals which are used to obtain timing signals.

The data transmission system represented in FIG. 1 comprises a data source DQ, a transmitter SE, a transmission link ST, a receiver EM, a data sink DS, an oscillator OS, a frequency divider FT1 and the synchronizing device SY. The data source DQ feeds the signal A to the transmitter SE where a carrier is modulated in accordance with a known modulation method and is transmitted over the transmission link ST to the receiver EM. Demodulation takes place in the receiver EM, so that the signal A is restored and conducted to the data sink DS. The data sink can, for example, be a data visual display unit or a tape punching device.

The synchronizing device SY is used to obtain a signal T with which the data sink DS is synchronized. Since generally the phase state of the signal A changes, the phase state of the signal T must also be constantly readjusted. The signal T is obtained with the aid of frequency dividers, whereby either additional pulse edges are gated into a frequency divider signal or else existing pulse edges are suppressed, so that a phase displacement of the signal T is produced.

FIG. 2 shows those signals with the aid of which the gating of additional pulse edges will be explained. The signal E is conducted to a frequency divider, which is not illustrated, the positive-going pulse edges of which signal actuate the frequency divider. In this case four positive-going pulse edges are active, and they occur at the times ***t*0, *t*4, *t*6, and *t*8**. As is known, it is possible to interpose a further pulse E5 between the two pulses E1 and E2, so that now from the time *t*1 until the time ***t*10** a total of five positive-going pulse edges are available, and a pulse shift is produced in a divider signal.

If the pulse repetition frequency of the signal E is already relatively high, it is difficult to add a pulse E5 between two existing pulses E1 and E2. These difficulties can be overcome in that between the pulses E1 and E2 the polarity of the signal E is reversed, so that the signal H1 is produced. This signal H1 now has five positive pulse edges which occur at the times ***t*0, *t*3, *t*5**, t7, and t9. Since, after the timer t1 until the time t4, after the gating in of the pulse E5, a total of four pulse edges occur, whereas in the case of the signal H1 only a total of three pulse edges occur, the signal H1 can be produced even when, on account of the high pulse repetition frequency of the signal E, the gating in of the pulse E5 is difficult.

If the polarity is reversed simultaneously to a pulse edge of the signal E, the pulse edges which can be used to control a following frequency divider are reduced. If, for example, at the time t4, the polarity of the signal E is reversed, the signal H2 is produced which exhibits a total of only four positive pulse edges at the times t0, t5, t7, and t9.

Figure 3:
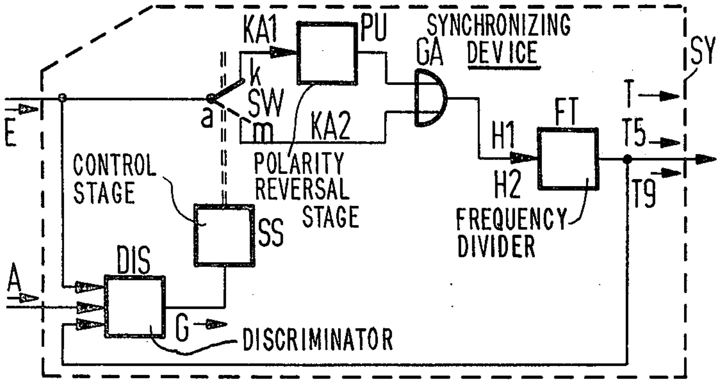
FIG. 3 is a schematic illustration of a circuit arrangement by means of which the phase state of a timing signal may be altered.

FIG. 3 shows a circuit arrangement by means of which pulse edges can be added to the signal E and edges of the signal E can be suppressed. This circuit arrangement basically comprises discriminator DIS, switch SW, control stage SS, polarity reversal stage PU, OR-gate GA and the frequency divider FT. The switch SW can assume one of two switching positions, whereby either the contacts *a* and *k* or the contacts *a* and *m* are conductively connected to one another. If the switch SW is controlled in such manner that from the time t0 to the time t3 it conductively connects the contacts *a* and *m* to one another and from the time t3 it conductively connects the contacts *a* and *k* to one another, then the OR-gate GA feeds the signal H1 to the frequency divider FT, and the signal T5 is produced. The polarity reversal stage PU is this case reverses the polarity of the signal E conducted over the channel KA1, from the time t3 onwards.

If the switching stage SW is controlled in such manner that from the time t0 until the time t4 it connects the contacts *a* and *m* to the channel KA2, whereas from the time t4 onwards it connects the contacts *a* and *k* conductively to one another, the signal H2 is produced which, with the aid of the frequency divider FT is transformed into the signal T9. The control stage SS and the switch SW are controlled with the discriminator signal G which is produced with the discriminator DIS.

Figure 4:
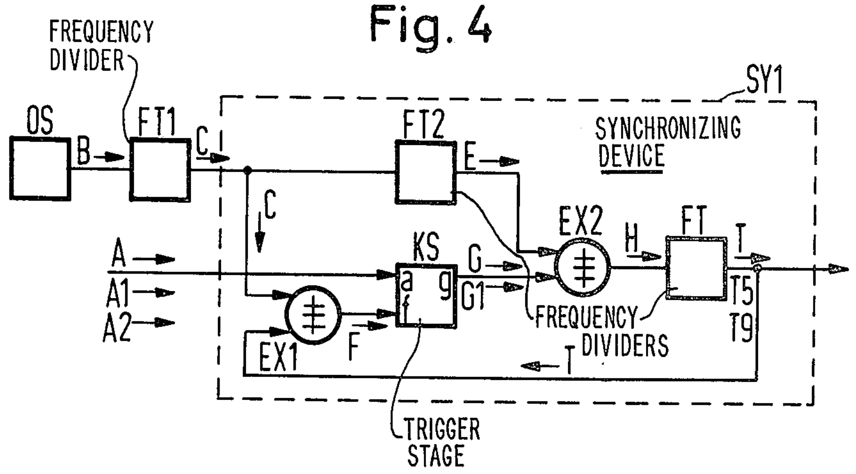
FIG. 4 is a schematic diagram of a preferred embodiment of a synchronizing device which is in conjunction with the FIG. 1 embodiment and FIGS. 5 through 8 are time-waveform diagrams illustrating signals which occur during the operation of the synchronizing device shown in FIG. 4.

FIG. 4 shows an exemplary embodiment SY1 of the synchronizing device basically illustrated in FIG. 3. This device comprises two EXCLUSIVE-OR gates EX1 and EX2, and of the two frequency dividers FT2, FT and of the trigger stage KS. The two gates EX1 and EX2 emit 1 signals only when their inputs are supplied with unlike signals. The frequency divider FT2 produces a frequency division in the ratio 2 : 1, and the frequency divider FT3 produces a frequency division in the ratio 4 : 1.

The trigger stage KS can assume two stable states, and during its 0 and 1 states it emits a 0 and 1 signal, respectively, via the output *g*. A transistion from the 0 state into the 1 state occurs whenever a 1 signal is present at the input *a*, and *a* negative pulse edge occurs at the input *f*. A transistion from the 1 state into the 0 state occurs whenever a 0 signal is present at the input *a*, and a negative pulse edge occurs at the input *f*.

The synchronizing device SY1 illustrated in FIG. 4 is characterized by a low cost for circuitry, because gate EX2 fulfills the functions of the switching stage SS, switch SW, polarity reversal stage PU and the gate GA shown in FIG. 3, and because the gate EX1 and the trigger stage KS form in a simple fashion the discriminator DIS shown in FIG. 3.

Figure 5:
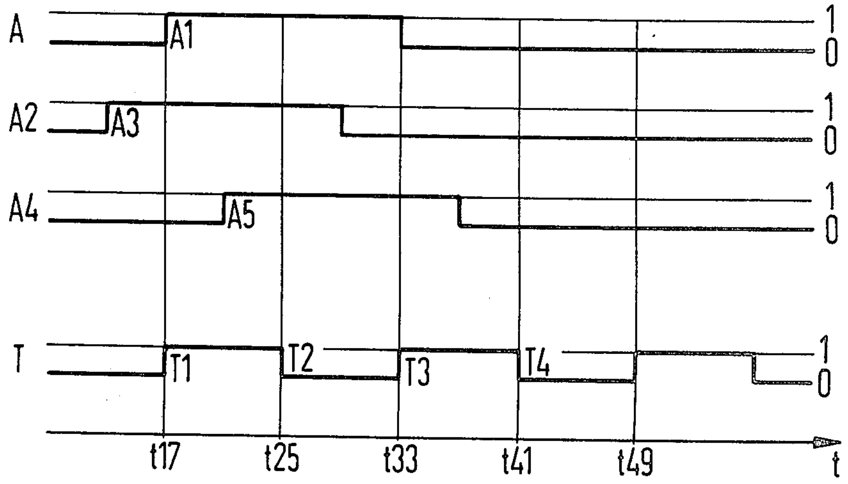

FIG. 5 shows a signal A which is received by the receiver EM illustrated in FIG. 1. The two binary values of the signal A and of other binary signals are characterized by the references 0 and 1. The data are transmitted with the signal A in the frame of a bit pattern governed by the times t17, t33, t49. A 1 value is transmitted, for example, from the time t17 until the time t33, and a 0 value from the time t33 until the time t49.

The signal T serves to synchronize the data sink DS shown in FIG. 1 and has the correct phase state when the positive-going pulse edge T1 coincides with the positive-going pulse edge A1. With this phase state of the signal T, the negative pulse edges T2 and T4 are in each case located in the middle of the given bit pattern. In the course of the transmission, the signal A can be shifted in phase in relation to the signal T so that the signals A2 and A4 are produced which lead and lag the signal T, respectively. The function of the synchronizing device SY is, in dependence upon the changing edges of the signals A2 and A4, to adjust the phase state of the signal T in such manner that its pulse edge T2 reoccurs in the middle of the pulses of the signals A2 and A4. In the adjusted state the pulse edge T1 coincides with the pulse edge A3 and with the pulse edge A5.

Figure 6:
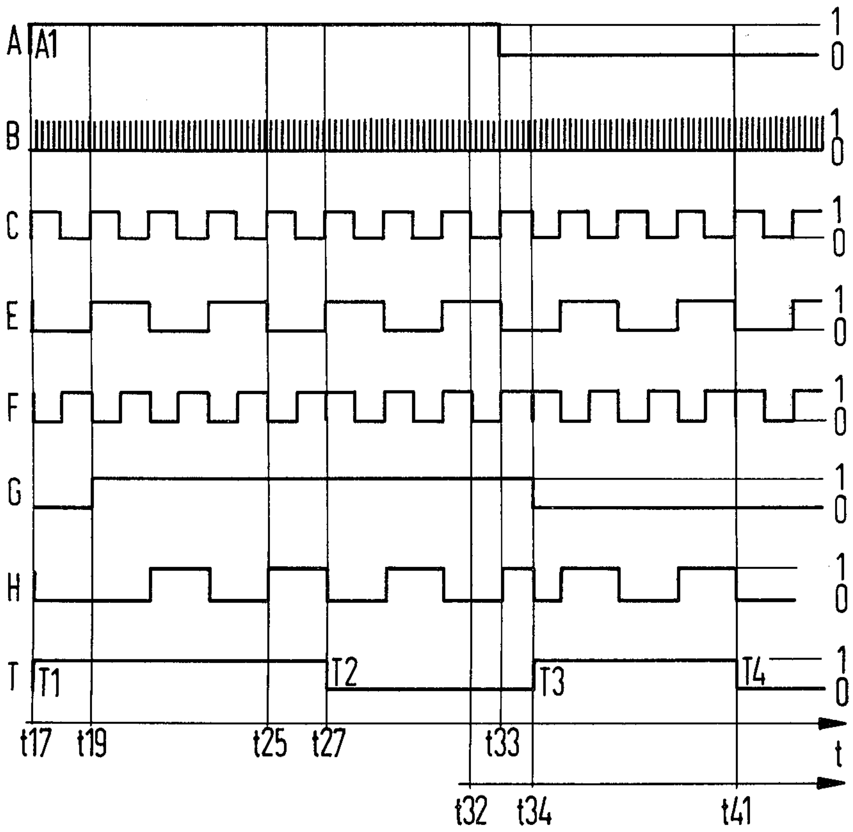
Figure 7:
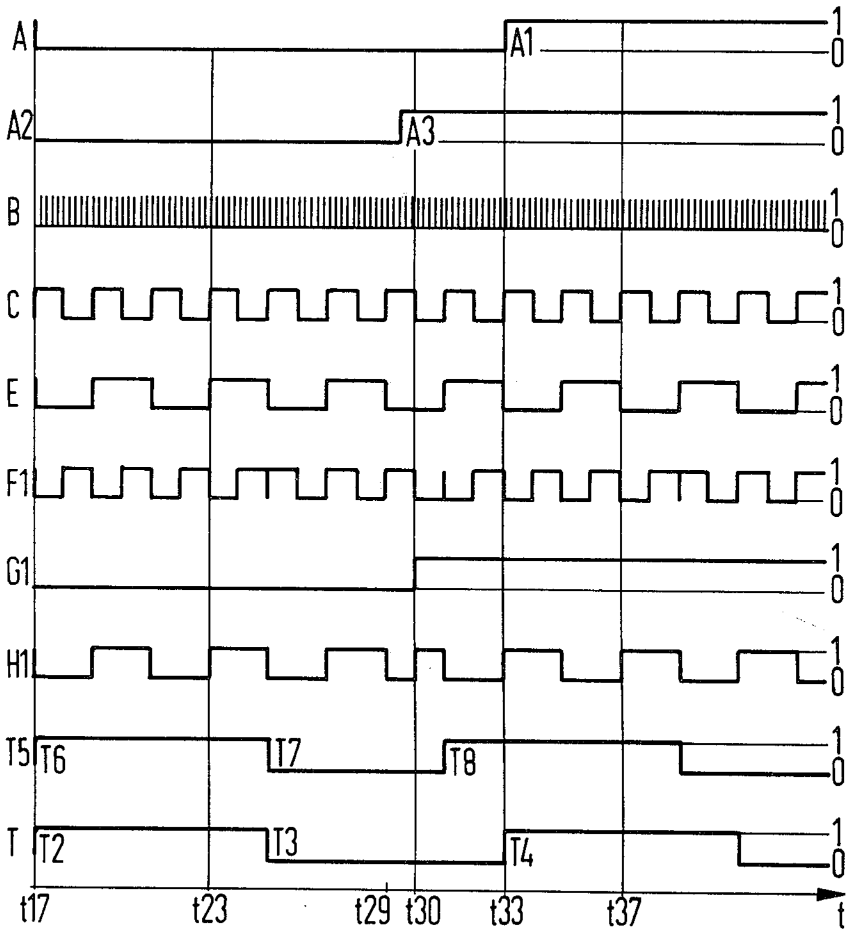
Figure 8:
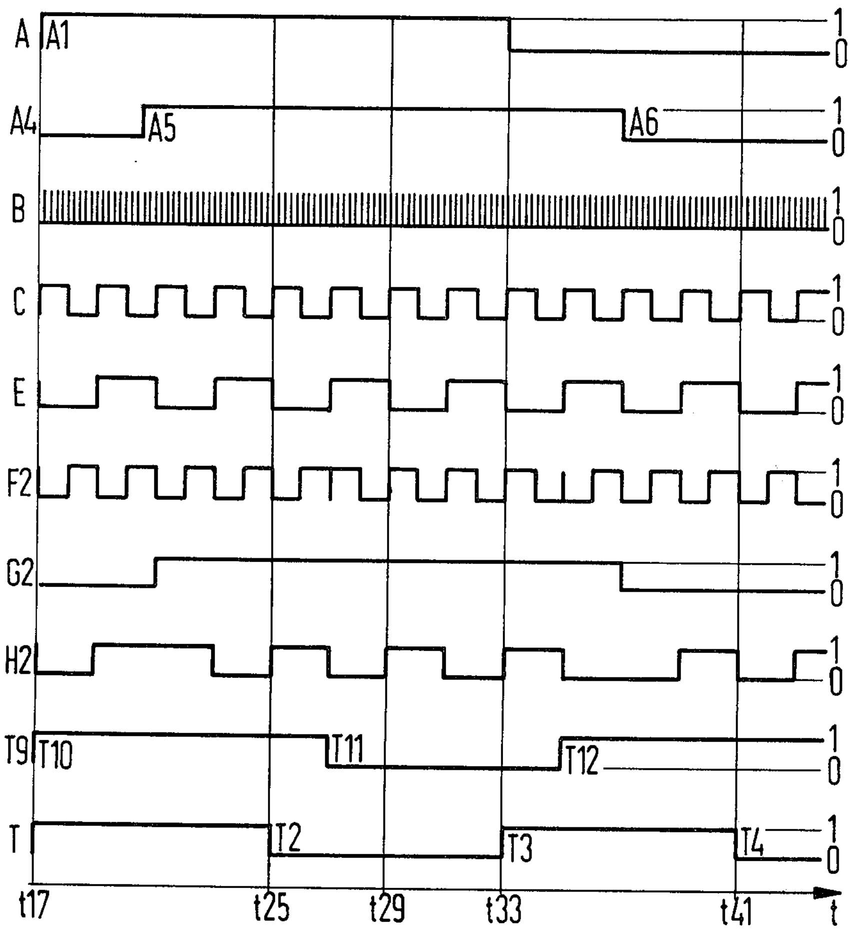

In the following the mode of operation of the synchronizing device SY1 illustrated in FIG. 4 will be explained with reference to the signals shown in FIGS. 6, 7 and 8. In FIG. 6 it has firstly been assumed that the signal T assumes the correct phase state in relation to the signal A. FIGS. 6, 7 and 8 show on an enlarged scale the signals which have been partly represented also in FIG. 5.

With the oscillator OS shown in FIG. 4, the frequency divider FT1 is supplied with the signal B from which, by frequency division, is obtained the signal C and in turn from which, with the further frequency divider FT2, the signal E is obtained. With T=0 the gate EX1 allows the signal C to pass unobstructed, and with T=1 reverses the polarity of the signal C. In this way the signal F is formed to have a polarity which is opposite to the polarity of the signal C between the times t17 and t27, and between the time t34 and t41.

The signal G is dependent upon the signal A and upon the signal F. At the time t19, with A=1, and the negative-going pulse edge of the signal F, the signal G=1 is emitted. From the time t34 onwards, with A=0 and with the negative edge of the signal F, the signal G=0 is emitted. In dependence upon the signal G, the polarity of the signal E is reversed at the times t19 and t34 so that the signal H is formed. From the time t17, with the second negative-going pulse edge of the signal H, the edge T2 is formed at the time t27. From the time t27 onwards, with the second negative edge of the signal H, the edge T3 is formed and from the time t34 with the second negative edge of the signal H, the edge T4 is formed. The edge T2 should occur at the time t25 and the edge T3 at the time t33. However, the edge T4 compensates this phase shift so that the edge T4 which occurs at the time t41 occurs precisely at the time at which it should occur in accordance with FIG. 5.

In FIG. 7 it has been assumed that, instead of the signal A, the signal A2 is received which leads the signal T. The signals B, C and E are not changed in any way. The frequency divider FT now emits the signal T5 having edges T6, T7 and T8 and thus, the polarity of the signal F1 is reversed. In dependence upon the signal F1 and the signal A2, the signal G1 is obtained. In dependence upon the signal G1 and the signal E, the signal H1 is obtained, from which the signal T5 is obtained, again by frequency division. By readjusting the phase, the edge T8 has been approximated to the edge A3.

FIG. 8 relates to a situation in which the signal A4 occurs in delayed relation to the signal A. The signals B, C and E are obtained as already described above. The signal F2 is produced from the signals T9 and C, and with the pulse edge T10, T11 and T12 the polarity of the signal C is changed, and the signal F2 is emitted. In dependence upon the signal A4 and the signal F2, the signal G2 is emitted which, together with the signal E2, triggers the signal H2. It is now assumed that at the time *t*17 an edge of the signal T9′occurs. After two negative pulse edges of the signal H2, the edge T11 is produced, and after another two negative pulse edges, the edge T12 is produced. Whereas the edge T10 still leads the edge A5 very considerably, the edge T11 is already approximated to the middle of the signal A4, occurring at the time *t*29.

The preferred embodiments of the invention described hereinabove are only exemplary of its principles. It is contemplated that the described embodiments can be modified or changed while remaining within the scope of the invention as defined by the appended claims.

I claim:

1. Apparatus for adjusting the phase state of a timing signal which has been obtained by means of a frequency divider from a divider signal, wherein a discriminator signal is produced in dependence on the phase state of a binary signal and wherein pulse edges of the divider signal are added to or suppressed from the divider signal, comprising:

polarity reversal means, first channel means connecting said divider signal to said polarity reversal means and then to an input of said frequency divider, second channel means connecting said divider signal to an input of said frequency divider, switching means for selectively connecting said divider signal to said first or second channel in dependence on the value of said discriminator signal.

2. The apparatus defined in claim 1 wherein said switching means is constructed to respond to said discriminator signal to switch between two edges of said divider signal when said binary signal leads said timing signal.

3. The apparatus defined in claim 1 wherein said switching means is constructed to respond to said discriminator signal to switch simultaneously with the appearance of two pulse edges of said divider signal.

4. The apparatus defined in claim 1, further comprising:

discriminator means for producing said discriminator signal in dependence on the pulse edges of said binary signal in such manner that in the event of leading and lagging edges of said binary signal, and edge of said discriminator signal does and does not, respectively, coincide with an edge of said divider signal.

5. The apparatus defined in claim 1 wherein said polarity reversal means is an EXCLUSIVE-OR gate having inputs connected to receive said divider signal and said discriminator signal and having an output connected to said frequency divider.

6. The apparatus defined in claim 1 further comprising:

an additional frequency divider emitting an additional divider signal, and additional EXCLUSIVE-OR gate having inputs connected to receive said additional divider signal and said timing signal, a trigger stage having a first input connected to receive the output of said EXCLUSIVE-OR gate and a second input connected to receive said binary signal, the output of said trigger stage emitting said discriminator signal.

* * * * *